US011459177B2

(12) United States Patent
Bannerman et al.

(10) Patent No.: US 11,459,177 B2
(45) Date of Patent: Oct. 4, 2022

(54) CONVEYOR BRACKET

(71) Applicant: Laitram, L.L.C., Harahan, LA (US)

(72) Inventors: Adam E. Bannerman, Mandeville, LA (US); Omari K. Davis, Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 100 days.

(21) Appl. No.: 16/981,010

(22) PCT Filed: Apr. 4, 2019

(86) PCT No.: PCT/US2019/025808
§ 371 (c)(1),
(2) Date: Sep. 15, 2020

(87) PCT Pub. No.: WO2019/199574
PCT Pub. Date: Oct. 17, 2019

(65) Prior Publication Data
US 2021/0107740 A1 Apr. 15, 2021

Related U.S. Application Data

(60) Provisional application No. 62/656,036, filed on Apr. 11, 2018.

(51) Int. Cl.
*B65G 15/60* (2006.01)
*B65G 21/20* (2006.01)
*B65G 21/22* (2006.01)
(52) U.S. Cl.
CPC ............. *B65G 15/60* (2013.01); *B65G 21/20* (2013.01); *B65G 21/22* (2013.01)

(58) Field of Classification Search
CPC ........ B65G 15/60; B65G 21/20; B65G 15/62; B65G 15/08; B65G 2207/30; B65G 21/22; B65G 2207/48
See application file for complete search history.

(56) References Cited

U.S. PATENT DOCUMENTS

| 4,932,516 | A  | * | 6/1990  | Andersson ......... B65G 21/2081 198/841 |
| 5,190,145 | A  | * | 3/1993  | Ledginham ............ B65G 21/22 198/841 |
| 6,269,939 | B1 |   | 8/2001  | Lapeyre et al. |
| 6,640,966 | B2 | * | 11/2003 | Reatti .................... B65G 15/60 198/841 |
| 7,114,615 | B1 |   | 10/2006 | Karpy |
| 7,753,194 | B1 | * | 7/2010  | Jager ..................... B65G 15/62 198/860.1 |
| 7,815,040 | B2 |   | 10/2010 | Kuiper et al. |

(Continued)

FOREIGN PATENT DOCUMENTS

| JP | 05-082920 U | 11/1993 | |
| KR | 10-1007676 B1 | 1/2011 | |
| WO | WO-2017087321 A * | 5/2017 | ............. B65G 15/62 |

*Primary Examiner* — Mark A Deuble
(74) *Attorney, Agent, or Firm* — Catherine M. Bishop

(57) ABSTRACT

A conveyor conversion kit includes a plurality of conveyor brackets for converting a conveyor frame to accommodate a new conveyor belt. Each bracket includes a base, a plurality of wearstrip seats for mounting wearstrips forming a carryway for the conveyor belt without tools and side guard seats for mounting side guards to contain the conveyor belt on the carryway without tools.

16 Claims, 10 Drawing Sheets

(56) References Cited

U.S. PATENT DOCUMENTS

| | | | |
|---|---|---|---|
| 7,997,405 B2* | 8/2011 | Karpy | B65G 15/62 |
| | | | 198/860.1 |
| 8,770,391 B2 | 7/2014 | Gibbs et al. | |
| 9,682,824 B2* | 6/2017 | Peters | F16B 3/00 |
| 9,815,631 B2* | 11/2017 | Ghezzi | B65G 21/22 |
| 10,329,093 B2 | 6/2019 | Bannerman | |
| 2006/0237292 A1 | 10/2006 | Ryan | |
| 2013/0277181 A1 | 10/2013 | Kuiper | |
| 2015/0210478 A1* | 7/2015 | Batchelder | F16B 2/22 |
| | | | 198/860.1 |

* cited by examiner

CONVEYOR BRACKET

RELATED APPLICATIONS

The present invention claims priority to U.S. Provisional Patent Application Ser. No. 62/656,036, filed Apr. 11, 2018, and entitled "Conveyor Bracket", the contents of which are herein incorporated by reference.

BACKGROUND

The invention relates generally to frames for power-driven conveyors. More particularly, the invention relates to brackets used to convert a pre-existing conveyor frame to a conveyor frame usable with a new or different type of conveyor belt, a conveyor converted from a first type of conveyor belt to a second type of conveyor belt and a method for performing the conversion.

Many kinds of conveyors are used to transport articles. Roller conveyors, for example, consist of an array of metal rollers arranged side by side along the length of a conveyor frame. The ends of the rollers are retained in opposite sides of the conveyor frame. The rollers rotate about axes directed widthwise across the conveyor perpendicular to the conveyance direction. The rollers may be passive, but are commonly driven to rotate by a drive belt. The width of the conveyor frame is fixed to accommodate the axial length of the rollers. Roller conveyors work well, but are notoriously noisy and often require repair. As another example, flat belt conveyors are also commonly used to transport articles. These conveyors include flat rubber or fabric belts tensioned between drive and idler pulleys at opposite ends. But a flat belt can drift to one side of the pulleys and stretch over time. If it tears, the belt must be removed from the conveyor, the torn section cut out, and a new section spliced in.

Because of the shortcomings of roller conveyors and flat belt conveyors, it is often desirable to replace them with thermoplastic low tension direct drive conveyor belts, examples of which include, but are not limited to Thermodrive®, available from Intralox, LLC of Harahan, La., SuperDrive™, available from Volta Belting and others known in the art. But converting to a modular belt conveyor from a roller conveyor, a flat belt conveyor, or another type of conveyor is usually a time-consuming and costly operation and requires the addition of wearstrips or other components. The conversion is difficult mainly because conveyor frames are typically designed to accommodate the rollers or the belt they were originally specified to be used with.

Thus, there is a need for a simple means for converting a pre-existing conveyor frame into a conveyor that runs a different type of conveyor belt.

SUMMARY

A retrofit kit for converting a conveyor frame to enable a conveyor belt comprises brackets for mounting wearstrips forming a carryway for a conveyor belt. Each bracket includes a shaft holder for seating a shaft of the conveyor frame and a wearstrip seat for seating a wearstrip forming a carryway for the conveyor belt. A wearstrip configured to interlock with the brackets includes a nonlinear channel for coupling to a wearstrip seat.

According to one aspect, a conversion kit for converting a conveyor frame to accommodate wearstrips forming a carryway for a conveyor belt comprises a first bracket and a wearstrip. The first bracket comprises a base, a wearstrip seat formed in the base for receiving a wearstrip and a shaft holder comprising a protrusion extending from the base and a shaft seat at the end of the protrusion for seating a shaft of the conveyor frame. The wearstrip has a nonlinear channel for interlocking with the wearstrip seat.

According to another aspect, a bracket for connecting a wearstrip to a conveyor frame shaft comprises a base extending laterally from a first side to a second side, a shaft holder comprising a protrusion extending from the base and having an opening for receiving the conveyor frame shaft and a wearstrip seat comprising a shallow notch in an upper edge of the base separated from an elongated opening by a lateral beam.

According to another aspect, a method of retrofitting a positive-drive low tension thermoplastic conveyor belt to a flat belt conveyor frame comprises the steps of attaching a plurality of conversion brackets to shafts on the conveyor frame, each conversion bracket including a plurality of shaft seats and a plurality of wearstrip seats and inserting a wearstrip having a nonlinear channel into a wearstrip seat, such that the wearstrip is held above the shafts.

According to another aspect, a bracket for connecting a wearstrip and containment block to a longitudinally extending spine of a conveyor frame comprises a base extending laterally from a first side to a second side, a wearstrip seat formed in an upper edge of the base for receiving a wearstrip, an opening in a bottom edge of the base for mounting the base on a shaft and a containment block receptacle formed in the first side of the base for interlocking with a containment block. The containment block receptacle comprises a planar sheet extending perpendicular to the base, a first elongated opening in the planar sheet below a top edge of the planar sheet and a second elongated opening aligned with the first elongated opening formed in the base near the first side.

According to another aspect, a conversion kit for converting a conveyor frame to accommodate wearstrips forming a carryway for a conveyor belt comprises a plurality of straight brackets and a plurality of curved brackets. Each straight bracket extends from a first side to a second side and has a plurality of first open slots in an upper edge. A first flange extends up from the first side and has a second open slot extending perpendicular to the first open slots. A second flange extends up from the second side and has a third open slot extending parallel to the second open slot. Each curved bracket has a curved base extending from a first side to a second side and a plurality of fourth open slots in an upper edge of the curved base. A third flange extends perpendicular to the upper edge at the first side and has a fifth open slot facing inwards and extending perpendicular to the third flange. A fourth flange extends perpendicular to the upper edge at the second edge and has a sixth open slot facing inwards extending perpendicular to the fourth flange. The straight brackets are mounted at first and second ends of a spine and the curved brackets are mounted at intermediate points on the spine.

BRIEF DESCRIPTION OF THE DRAWINGS

These aspects and features of the invention are described in more detail in the following description, appended claims, and accompanying drawings, in which:

DETAILED DESCRIPTION

A kit for converting a conveyor frame includes a plurality of brackets that include wearstrip seats for seating wearstrips designed to interlock with the brackets to form a carryway for a conveyor belt. The invention will be described relative to certain illustrative embodiments, but the invention is not limited to these illustrative embodiments.

Figure 1:
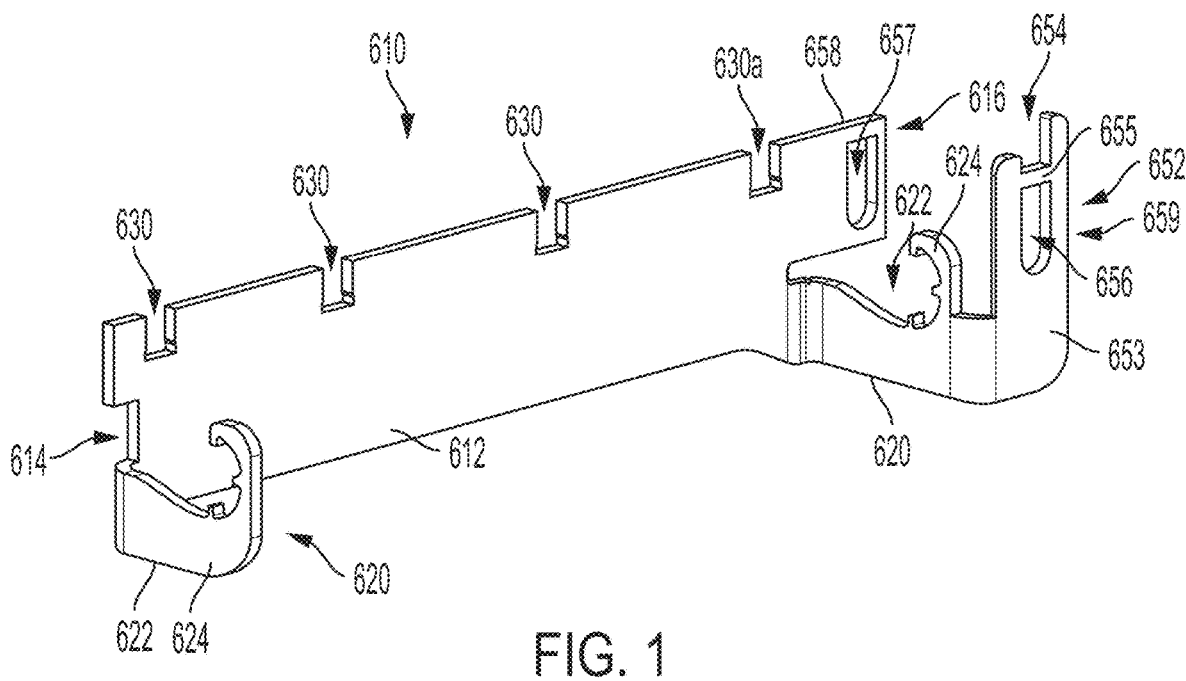
FIG. 1 is an isometric view of a first conversion bracket of an embodiment of the invention.
Figure 2:
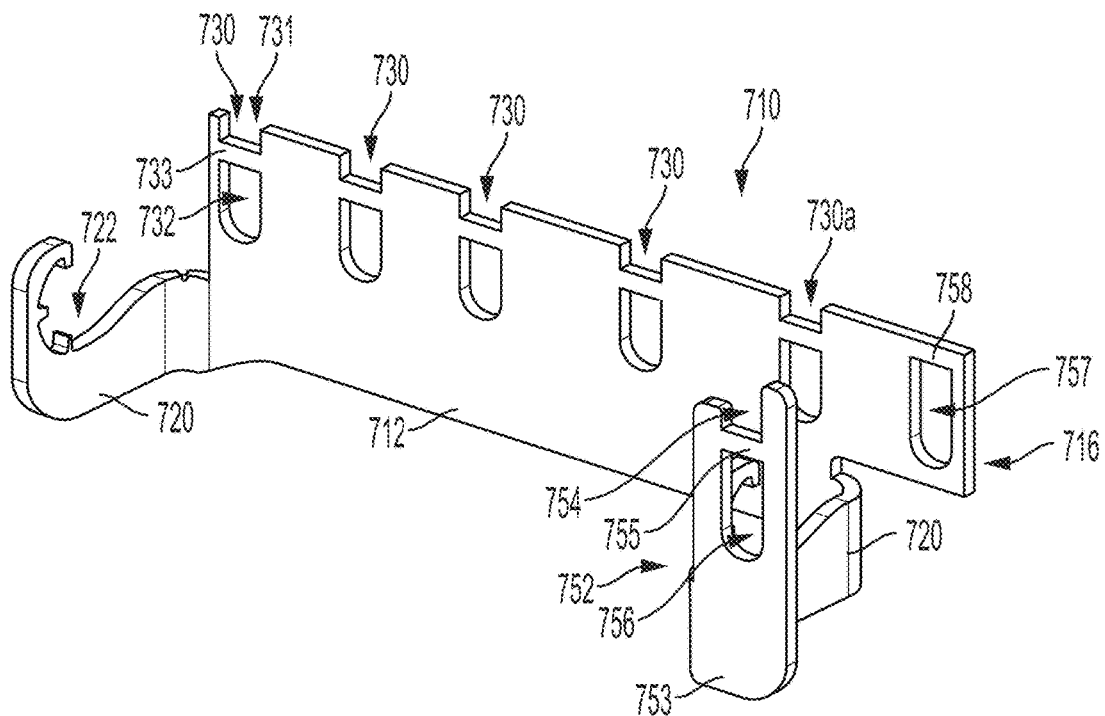
FIG. 2 is an isometric view of a second conversion bracket of an embodiment of the invention.

FIGS. 1 and 2 show two conveyor brackets 610, 710 suitable for cooperating to connect wearstrips to shafts in a conveyor frame. The first conveyor bracket 610 includes a base 612 comprising a substantially planar metal substrate extending laterally from a first side 614 to a second side 616. A plurality of shaft holders 620 extend from a first (front) end of the bracket for attaching the bracket 610 to a shaft in a pre-existing conveyor frame, as described below. Each illustrative shaft holder 620 comprises a protrusion extending from the base that curls up and inwards to form a seat 622 for receiving the shaft. The opening 622 is sized and positioned based on the size of the shaft. The shaft opening of the bracket may have any suitable size, shape and configuration to accommodate a particular size and shape conveyor component, such as a shaft. Each shaft opening 622 also includes cleaning recesses 624 to promote hygiene, though the invention is not so limited.

In one embodiment, the conveyor brackets 610, 710 are laser-cut from stainless steel that is bent-to-order, though the invention is not so limited.

The base 612 may have any suitable number of shaft holders 620 spaced apart at any suitable intervals. The shaft holder 620 can be sized and shaped to accommodate any suitable conveyor frame shaft.

The bracket 610 also includes a plurality of wearstrip receptacles 630 formed in the top edge of the base for connecting wearstrips forming a carryway for a conveyor belt to shafts held in the shaft openings 622. Each wearstrip receptacle 630 comprises a notch in the upper edge of the base sized and configured to receive a wearstrip. Each illustrative notch slightly flares out at the bottom, but the invention is not so limited.

The second conveyor bracket 710 includes wearstrip receptacles 730 that comprise a shallow notch 731 in an upper edge of a base 712 separated from an elongated opening 732 by a lateral beam 733. The elongated opening 732 has a rounded bottom. The conveyor bracket 710 also includes shaft holders 720 having curved seats 722 for mounting the bracket 710 to a shaft of a conveyor frame.

The brackets 610 and 710 may also include containment block receptacles 652, 752 at the second side 616, 716 of the bases 612, 712 for mounting side guards that flank the carryway to contain the conveyor belt. The brackets 610, 710 may include containment block receptacles on one or both sides. The illustrative containment block receptacles 652 comprises a planar sheet 653 extending from and substantially perpendicular to a shaft holder 620 on the second side 616. The planar sheet 653 has an upper shallow notch 654, a lateral beam 655 and an elongated opening 656 with a rounded bottom. Opposing the elongated opening 656, the second side 616 of the base 612 has an elongated, rounded bottom opening 657 aligned with and mirroring the elongated opening 656 in the planar sheet 653. A lateral beam 658 forming a portion of the top edge of the base 612 caps the elongated opening and aligns with beam 655. The outer edge 659 of planar sheet 653 aligns with the edge 616 of base 612.

The containment block receptacle 752 of bracket 710 mirror the containment block receptacle of bracket 610, including planar sheet 753, notch 754, aligned lateral beams 755, 758 and aligned elongated openings 756, 757.

Figure 3:
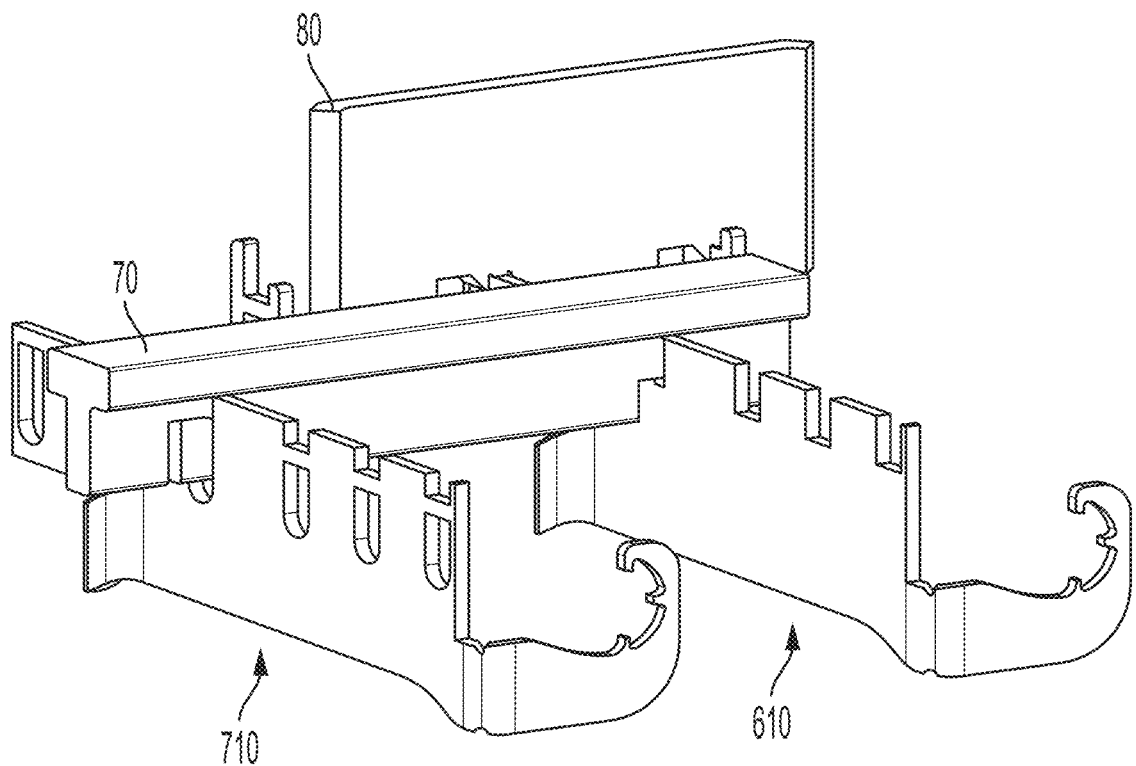
FIG. 3 is an isometric view of a wearstrip and containment block inserted in the conversion brackets of FIGS. 1 and 2.
Figure 4:
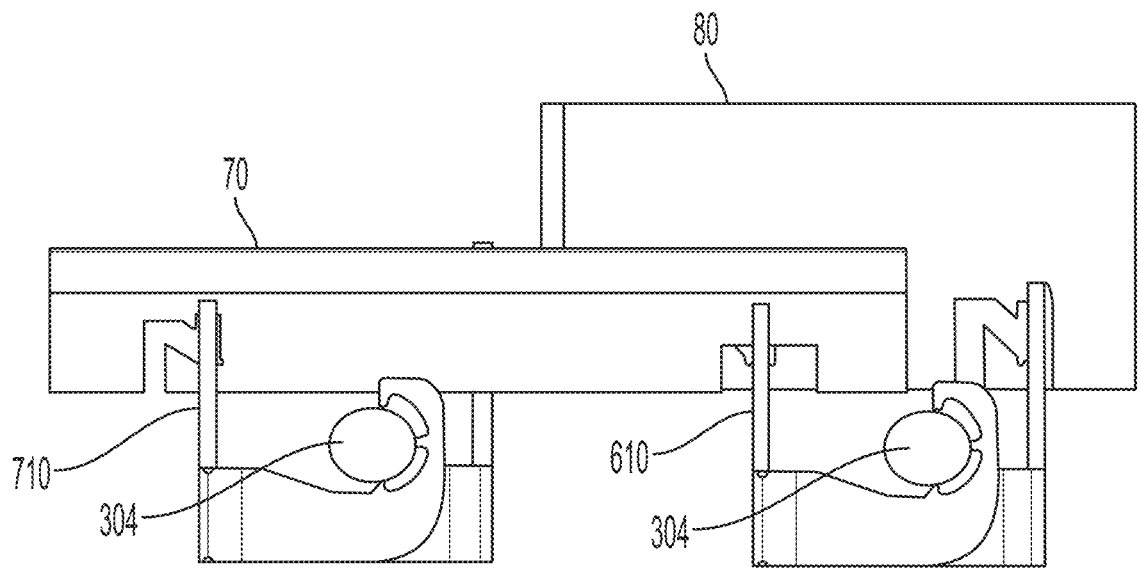
FIG. 4 is a side view of the assembly of FIG. 3.

The brackets 610, 710 can cooperate to mount wearstrips for a conveyor belt as shown in FIGS. 3 and 4. First, the brackets 610, 710 are mounted on shafts 304 by inserting the shafts 304 into the shaft seats 622, 722, thereby connecting the wearstrip receptacles 630, 730 to the shafts 304. The shaft holders 620, 720 can be welded to the shafts or otherwise affixed thereto. Then, wearstrips 70 are inserted in the associated wearstrip receptacles 630, 730. A wearstrip 70 can extend between a first wearstrip receptacle 630a on the first bracket 610 to a second wearstrip receptacle 730a aligned with the first wearstrip receptacle 630a to connected the brackets 610, 710 together. A containment block 80 defining a side guard at the edges of a carryway is inserted in the containment block receptacle 652. In the illustrative embodiment, the components of the brackets 610, 710 are oriented such that the wearstrip 70 extends substantially perpendicularly to the longitudinal axis of the shafts 304, and the containment block 80 extends substantially parallel to the wearstrip, though the invention is not so limited.

Figure 5:
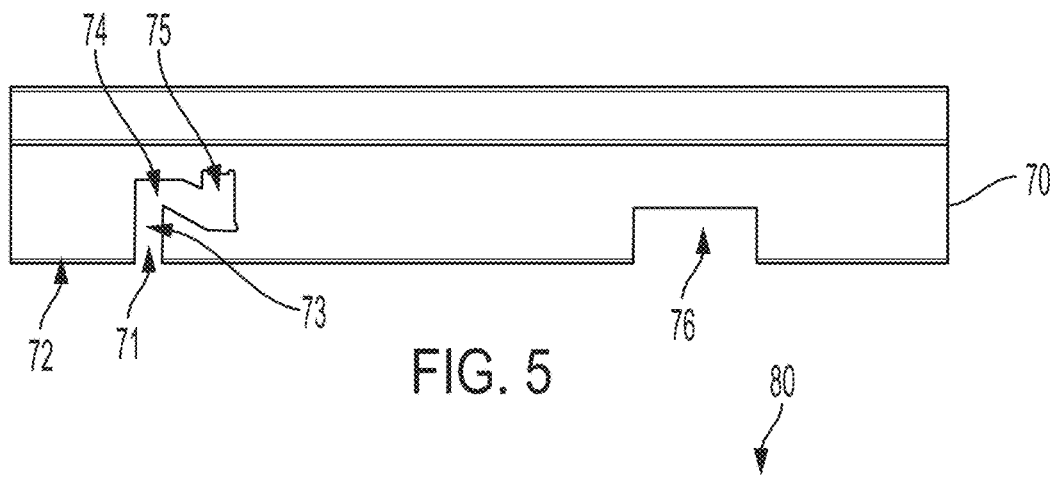
FIG. 5 is a cross-sectional side view of a wearstrip for use with a bracket of an embodiment of the invention.
Figure 6:
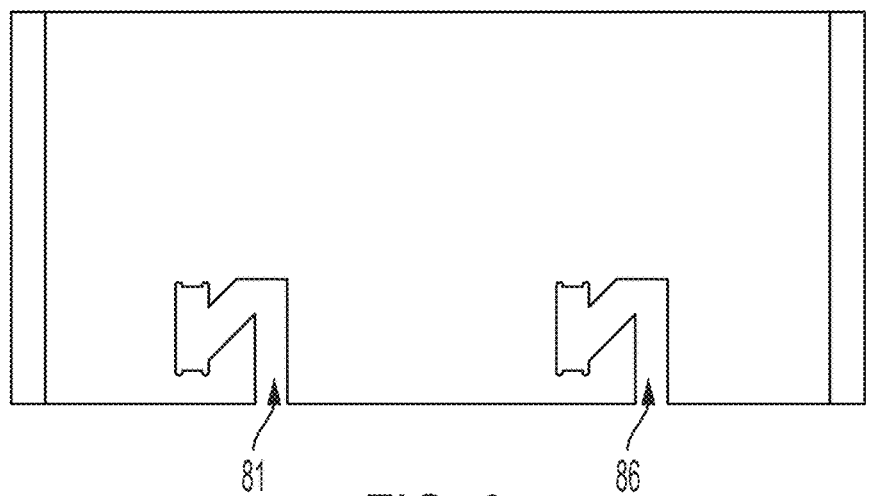
FIG. 6 is a side view of a containment block for use with a bracket of an embodiment of the invention.

The wearstrip 70 and containment blocks 80 are designed to interlock with the brackets 610, 710 without requiring additional tools. For example, as shown in FIG. 5, the wearstrip 70, which has a T-shaped cross-section, has a non-linear channel 71 extending up from the bottom surface 72 for mating with a wearstrip receptacle 730 on bracket 710. The non-linear channel 71 includes a first vertical portion 73 in communication with and extending up from the bottom surface 72. A transverse portion 74 extends downward at an angle from the top of the first vertical portion. A second vertical portion 75 extends up from the bottom of the transverse portion 74, which is above the bottom surface 72 of the wearstrip.

To attach the wearstrip 70 to the bracket 710, the inlet of the channel 71 is brought near a notch 731 of an associated wearstrip receptacle 730. The lateral bar 732 is inserted through the channel 71, finally resting in second vertical portion 75, with the solid portion of the wearstrip below the channel in the elongated opening 732.

The wearstrip 70 further includes a wider, shallower, linear notch 76 spaced from the channel 71 for coupling with a wearstrip receptacle 630 of a bracket 610. The notch 76 can be placed at any suitable location, depending on the spacing of shafts in the conveyor frame undergoing conversion.

Figure 7:
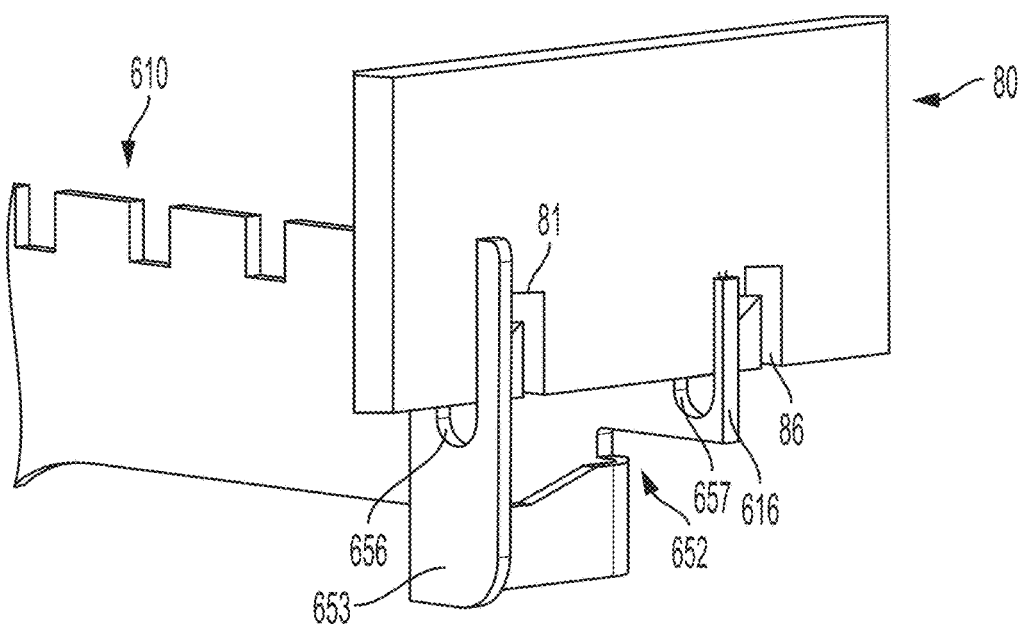
FIG. 7 shows the containment block of FIG. 6 inserted in the bracket of FIG. 1.

The containment block 80 includes non-linear channels 81, 86 for interlocking the containment block 80 with the containment block receptacles 652 or 752, as shown in FIG. 7. The channels 81, 86 are spaced apart by the same separation distance that separates the planar sheet 653 from the base portion 612 of the bracket 610.

The width of the brackets 610, 710 can change with conveyor width. The spacing of the wearstrips can also change with conveyor width. It is also feasible to manipulate the spacing of the wearstrip to facilitate a conveyor shape or a product loading. The invention can also be used to convert a conveyor frame for modular plastic conveyor belts or other conveyor belts and is not limited to a thermoplastic, direct drive conveyor belt.

Figure 8:
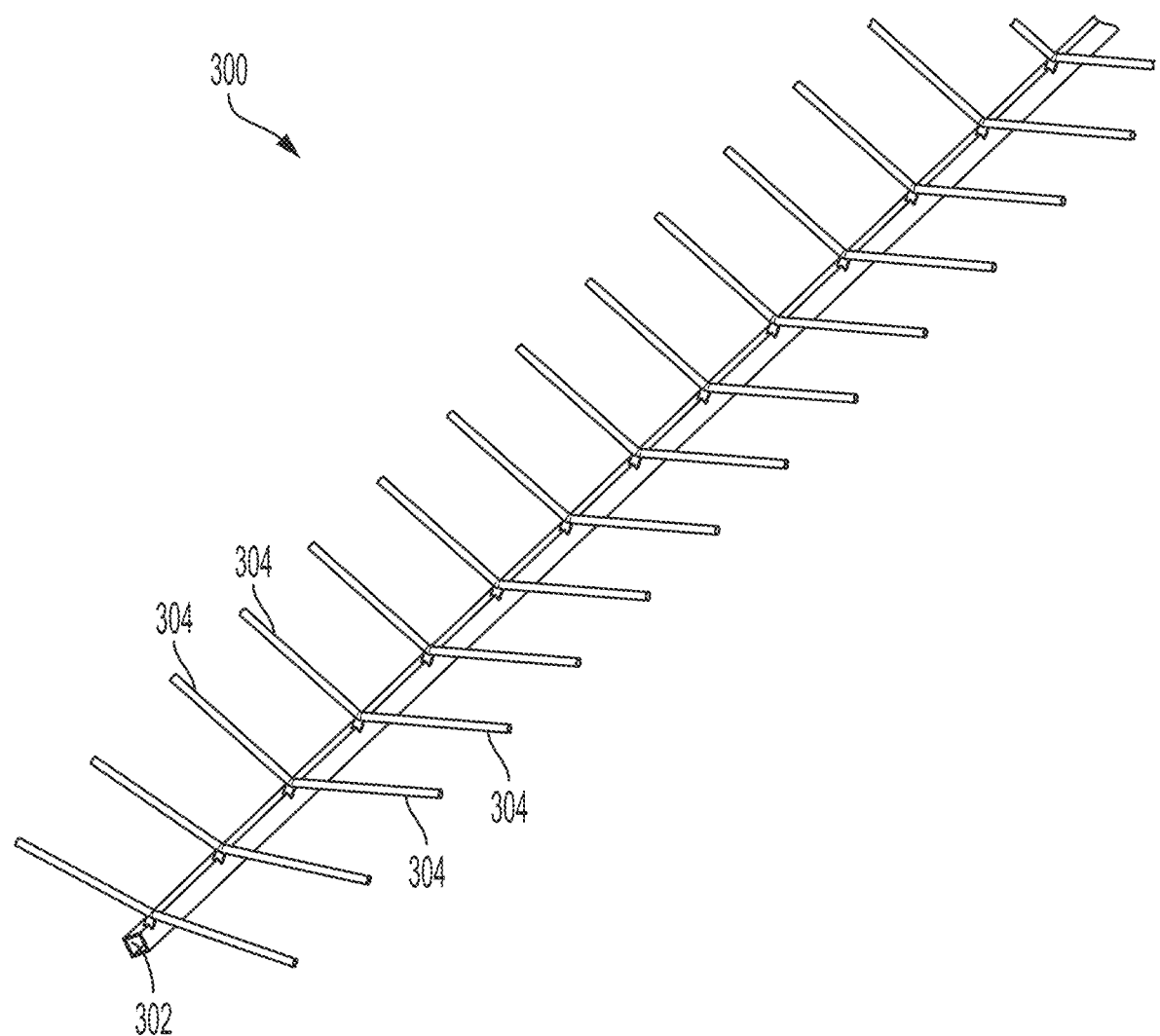
FIG. 8 shows a conveyor frame suitable for retrofitting using a retrofit kit of an embodiment of the invention.

In one application, the conversion brackets 610, 710 may be used to convert a pre-existing frame, such as a frame 300 shown in FIG. 8 to accommodate a new conveyor belt. The frame 300 of FIG. 8, which is known as a "rabbit ear conveyor frame" includes a central spine 302 and a plurality of shafts 304 extending up and out at an angle from the central spine. The shafts 304 form "rabbit ears" to allow troughing of a conveyor belt. The illustrative shafts 304 are spaced about 2 feet apart along the length of the spine 302.

A plurality of conversion brackets 610, 710 may be attached to selective shafts 304 in an alternating pattern to allow installation of wearstrips on the frame. The conversion brackets 610, 710 are attached by inserting the shafts 304 into the shaft seats 622 or 722 of the brackets 610 or 710.

Figure 9:
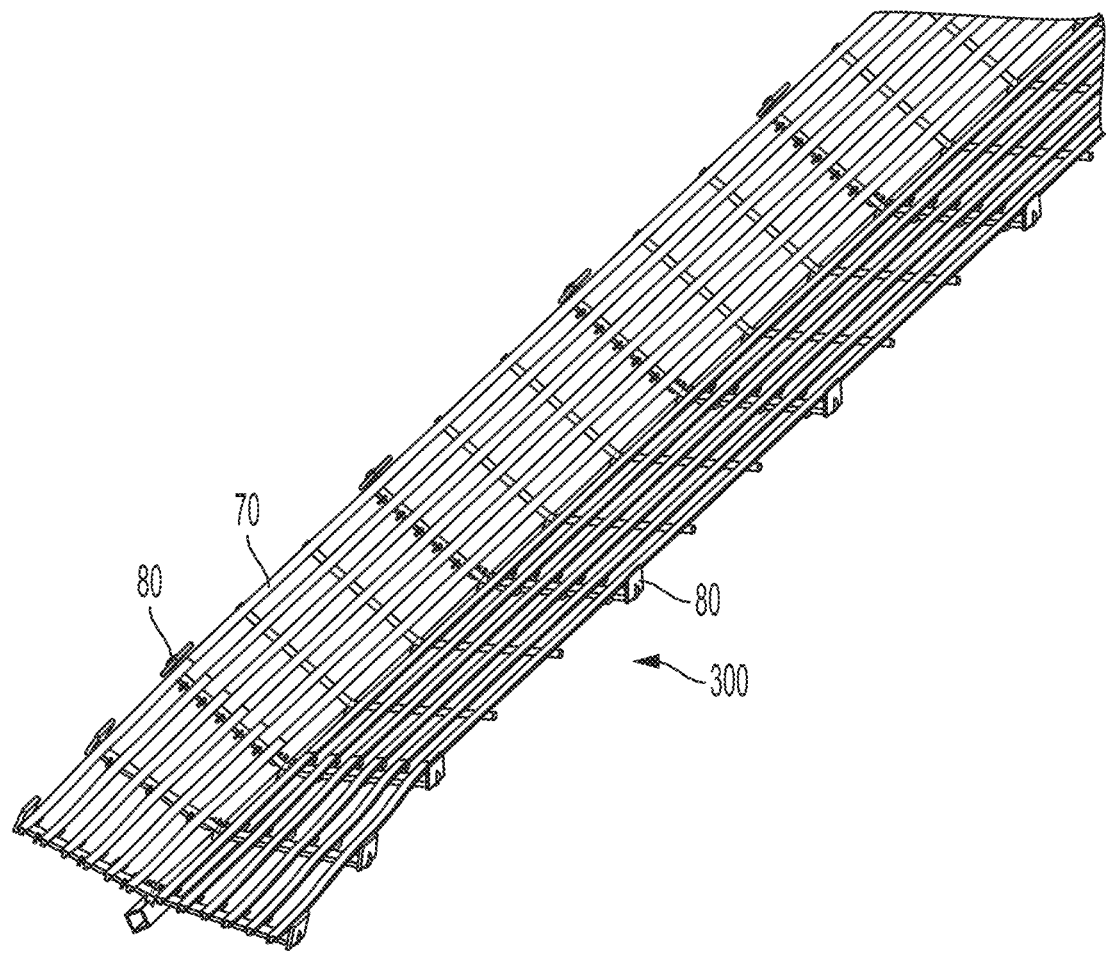
FIG. 9 shows the conveyor frame of FIG. 8 after retrofitting using a retrofit of an embodiment of the invention.

After assembling the conversion brackets 610, 710 in an alternating pattern along the length of the frame, wearstrips 70 are inserted into the wearstrip receptacles 630, 730, as shown in FIG. 9 and locked in place using the geometry of the parts. The wearstrips 70 can be bent and-or twisted to conform to the wearstrip receptacles, particularly in the transition areas at the ends of the frame.

The wearstrips 70, when inserted in the wearstrip receptacles 630, 730, rest on the shafts 304 or slightly above the shafts 304 so they can deflect into contact with the shafts 304 under load, allowing the original frame to support the carryway and eliminating the need to remove components of the original frame.

After assembling the wearstrips, containment blocks 80 for containing a conveyor belt on the carryway are inserted in the containment block receptacles 652, 752 of the brackets. The containment blocks can be alternatively be retained mechanically, such as with a rivet, pin or other fastener. In this manner, the containment blocks 80 can be easily installed, removed and-or replaced as needed.

Figure 10:
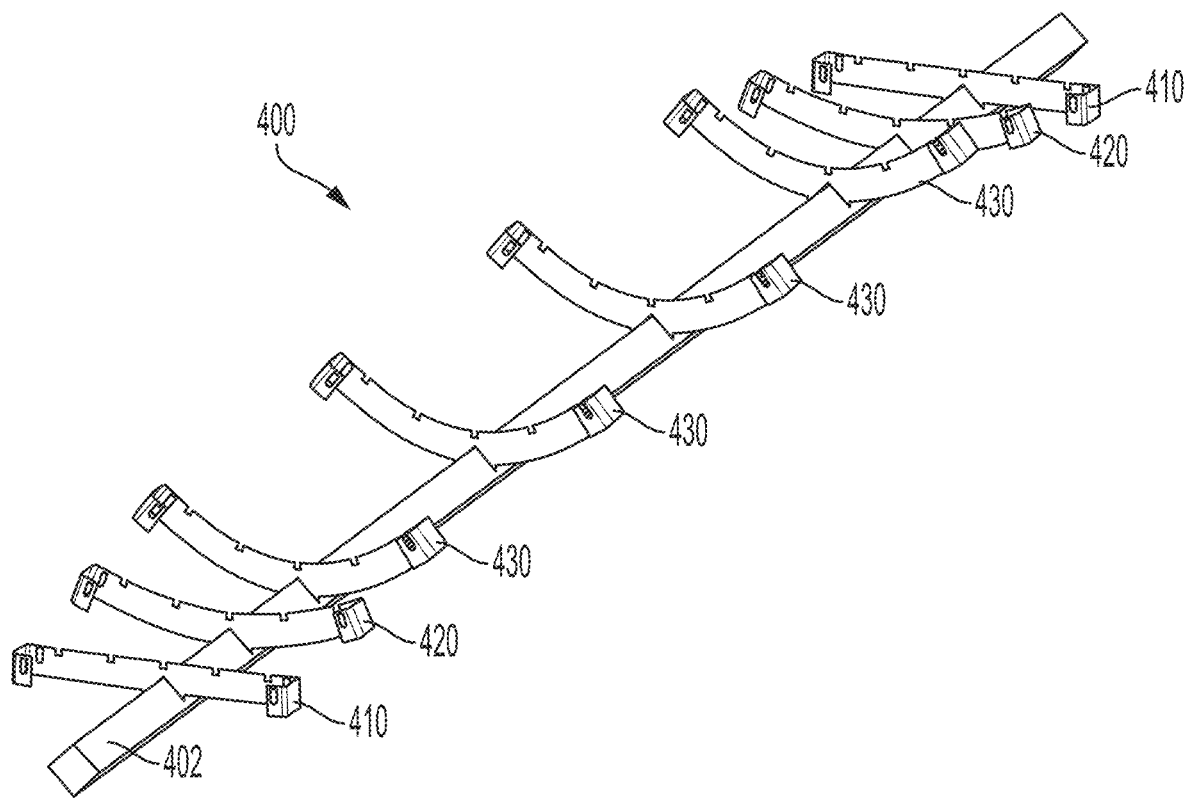
FIG. 10 is an isometric view of a converted conveyor frame employing a plurality of brackets according to another embodiment of the invention.
Figure 11:
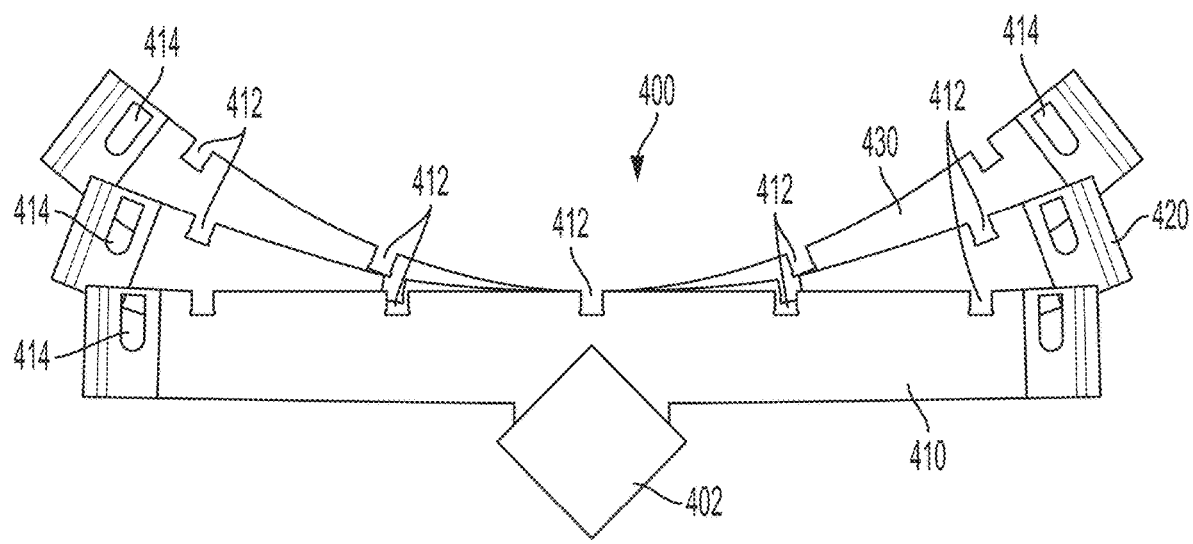
FIG. 11 is a front view of the converted conveyor frame of FIG. 10.
Figure 12:
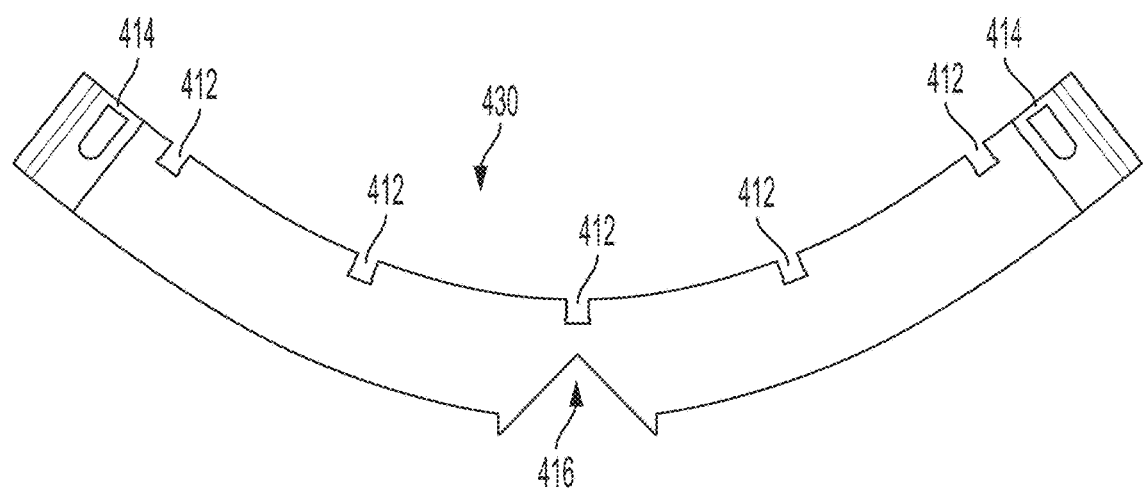
FIG. 12 is a front view of one of the troughed brackets in the converted conveyor frame of FIG. 10.

FIG. 10 shows another embodiment of a converted conveyor frame 400 using a kit comprising a plurality of conversion brackets 410, 420, 430 attached directly to a central spine 402 and including wearstrip receptacles and container block receptacles configured to receive and interlock with wearstrip and containment blocks without requiring additional tools. The illustrative converted conveyor frame 400 employs brackets having troughed profiles and straight profiles, but the invention is not so limited. The frame 400 includes straight brackets 410 at each end for supporting the belt in the transition areas. The brackets progressively curve towards the center of the belt to create a trough for conveying product. Intermediate brackets 420 have intermediate curves and central brackets 430 have larger curves so that the conveyor belt forms a trough in this area. FIG. 11 is a front view of the converted conveyor frame 400, showing a straight bracket 410, a slightly curved bracket 420 and a troughed bracket 430, each mounted on the spine 402 and including wearstrip receptacles 412 and container block receptacles 414. FIG. 12, which is a front view of the troughed bracket 430 shows the bottom opening 416 for mounting the bracket 430 to the central spine 402. The wearstrip receptacles and container block receptacles may be similar to those described above with respect to brackets 610, 710 and configured to fit with nonlinear channels on associated wearstrips and containment blocks to assemble the carryway of the conveyor. Alternatively, the wearstrip receptacles and container block receptacles may be configured to hold the wearstrips and-or container blocks forming side guards via friction fit, a snap fit, a mechanical fit or any suitable means. The brackets 410, 420 and 430 can be welded or otherwise connected to the central spine.

Figure 13:
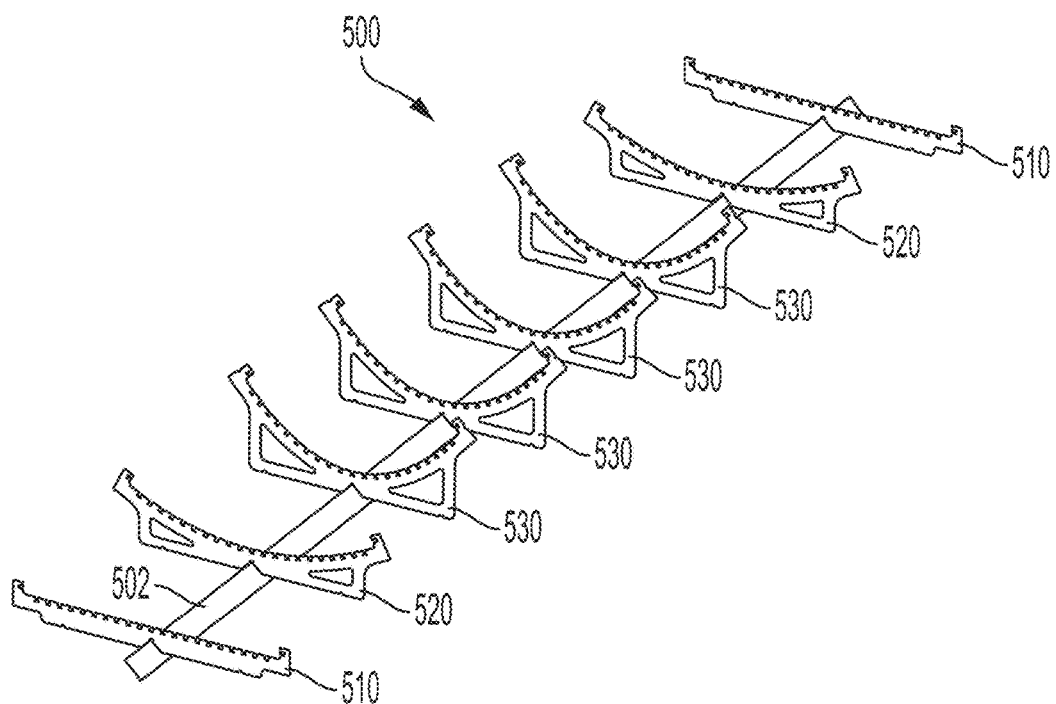
FIG. 13 is an isometric view of a converted conveyor frame employing a plurality of brackets according to another embodiment of the invention.
Figure 14:
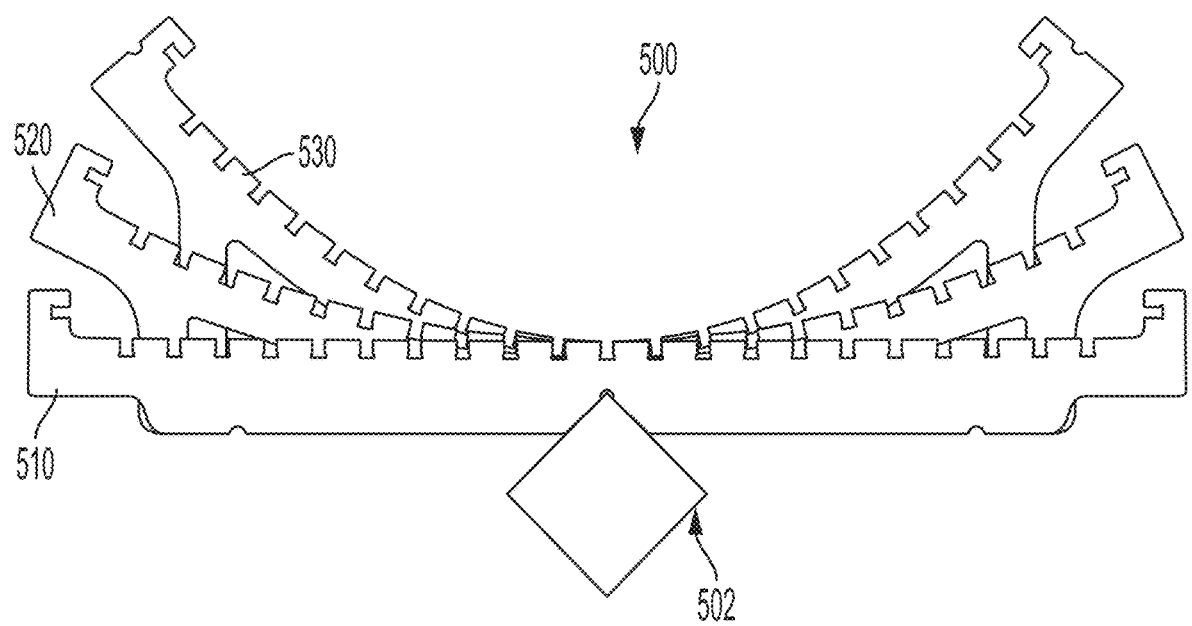
FIG. 14 is a front view of the converted conveyor frame of FIG. 13.
Figure 15:
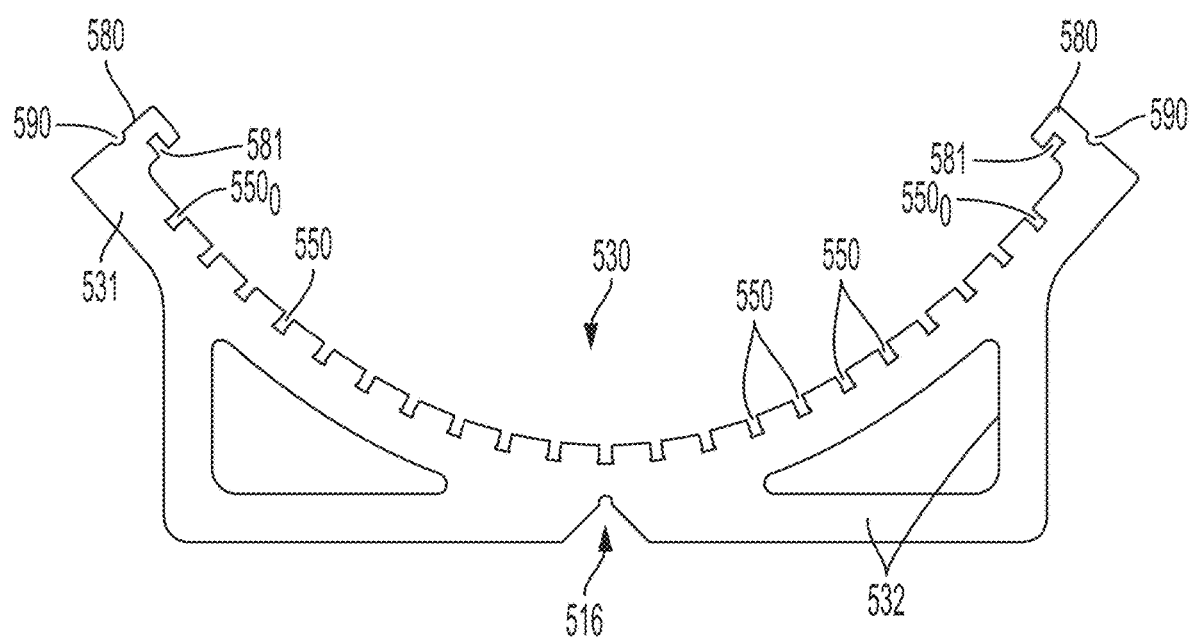
FIG. 15 is a front view of a central curved bracket of the converted conveyor frame of FIG. 13.
Figure 16:
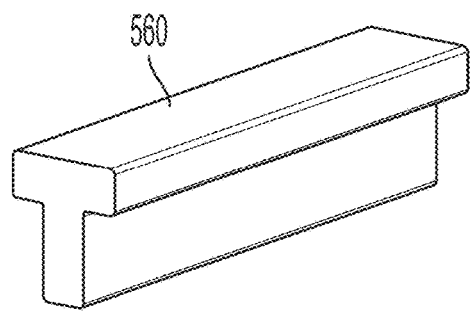
FIG. 16 is an isometric view of a wearstrip suitable for use with the conveyor frame of FIG. 13.
Figure 17:
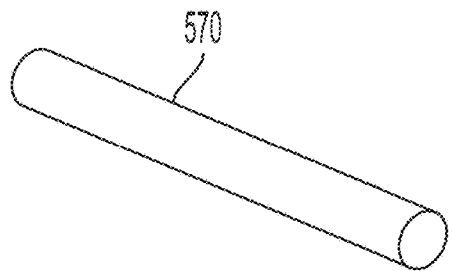
FIG. 17 is an isometric view of a reinforcing bar suitable for use with the conveyor frame of FIG. 13.

FIGS. 13 and 14 show another embodiment of a conveyor frame 500 formed using a kit comprising a plurality of brackets 510, 520, 530 for holding wearstrips that form a carryway. The brackets are connected to a central spine 502. Brackets 510 at each end of the spine are straight, intermediate brackets 520 have a slight curve and central brackets 530 have a larger curve to form a trough. FIG. 15 is a front view of the central bracket 530. FIG. 16 shows a portion of a wearstrip 560 suitable for use with the brackets 510, 520, 530 to form a carryway for a conveyor belt. The illustrative wearstrip 560 has a T-shaped cross-section. FIG. 17 shows an embodiment of a support bar 570, which may be to provide extra rigidity to the conveyor frame.

Each bracket includes a plurality of open slots 550 in a top edge of a base 531 extending from a first side to a second side for receiving and holding a portion of a wearstrip. The slots 550 and wearstrips 560 are sized and configured so that the slots 550 hold the wearstrips 560 tightly by pinch design, without requiring tools or connectors.

The side of each bracket includes a flange 580 extending at a right angle from the top of the bracket base at that side. Each flange 580 includes an open slot 581 essentially extending at a right angle to the next nearest open slot $550_o$ and facing inwards, towards the lateral middle of the frame. A wearstrip inserted in the flange open slot 580 functions as a side guard for a conveyor belt that is mounted on the conveyor frame. The side guards extend along each side of a conveyor belt extending along a carryway formed by the top edge open slots 550 to contain the conveyor belt.

Figure 18:
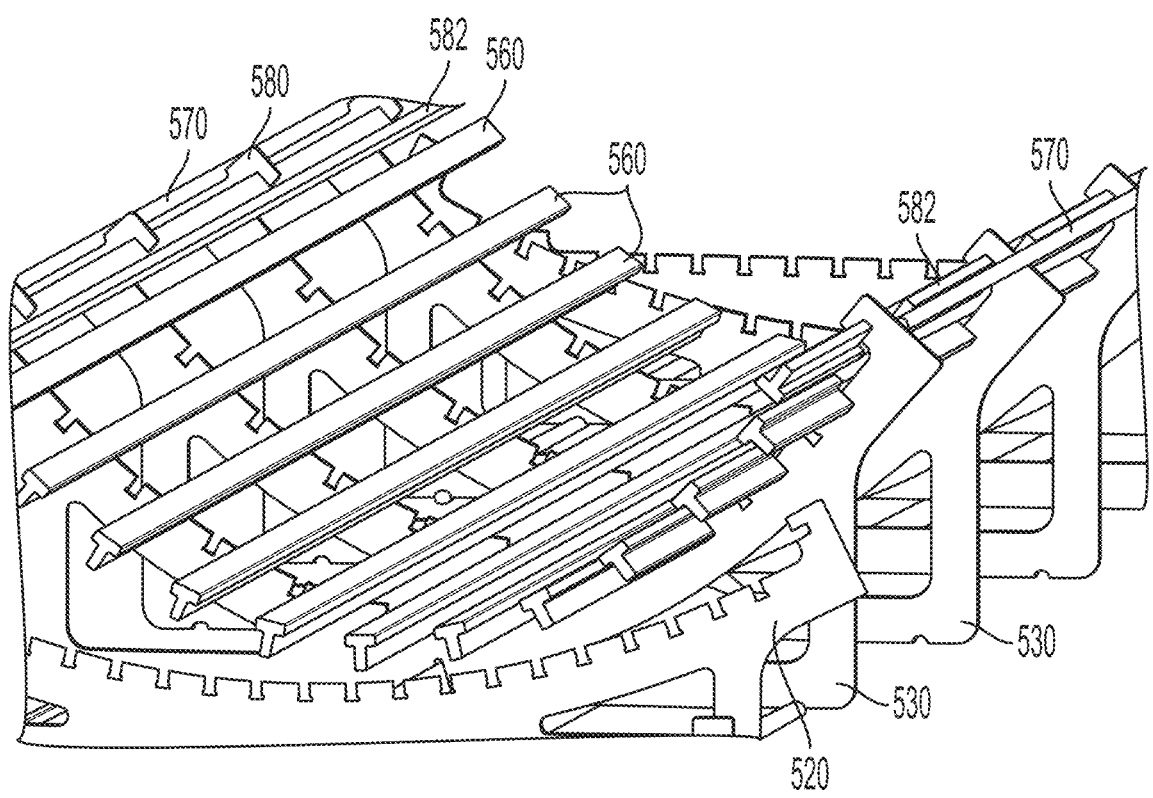
FIG. 18 is an isometric view of the converted conveyor frame of FIG. 13 with wearstrips and reinforcing bars in place.

One or more of the flanges 570 may include a recess 590 on an outer surface forming a seat for a reinforcing bar 570. As shown in FIG. 18, after connecting the brackets 510, 520, 530 to the central spine 502, reinforcing bars 570 may be seated in the recesses 590 of several central brackets 530 and connected to the brackets to reinforce the frame structure. As also shown in FIG. 18, the T-shaped wearstrips may be inserted in the slots, with the stem of each wearstrip received in a slot, and the top portion forming the carryway for contacting and guiding a conveyor belt. When a conveyor belt is mounted on the frame 500, the outside wearstrips 582 flank the sides of the conveyor belt and the other wearstrips 560 are under the conveyor belt.

Each curved bracket may further include bracing arms 532 for additional support. In addition, each bracket includes a bottom opening 516 for mounting the bracket to the central spine 502.

The conversion kit of the illustrative embodiments allows quick, simplified and economical retrofitting of a conveyor frame to accommodate a new or different conveyor belt. The conversion kit limits downtime and while ensuring cleanability of the converted conveyor frame. The wearstrips may be easily removed and changed if needed and the lack of connectors, clips, screws or other potential bacteria harborage points enhances hygiene.

Although the invention has been described with reference to specific versions, other versions are possible. The scope of the invention is not meant to be limited to the exemplary versions described in detailed.

What is claimed is:

1. A conversion kit for converting a conveyor frame comprising a plurality of shaft to accommodate wearstrips forming a carryway for a conveyor belt, comprising:
   a first bracket comprising a base, a wearstrip seat formed in the base for receiving a wearstrip and a shaft holder comprising a protrusion extending from the base and a shaft seat at the end of the protrusion for seating a shaft of the conveyor frame;
   a wearstrip having a nonlinear channel for interlocking with the wearstrip seat; and
   a container block holder extending from a first side of the base, the container block holder comprising a planar sheet extending perpendicular to the protrusion of the shaft holder, a notch on top of the planar sheet, an elongated opening below the notch and a lateral beam separating the notch from the elongated opening.

2. The conversion kit of claim 1, further comprising a second bracket having a shaft seat for a shaft and a wearstrip seat for receiving the wearstrip, the wearstrip having a notch for engaging the wearstrip seat of the second bracket.

3. The conversion kit of claim 1, wherein the container block holder further comprises an elongated opening in the base that aligns with the elongated opening in the planar sheet.

4. The conversion kit of claim 3, further comprising a container block having nonlinear channels interlocking with the notch and opening.

5. The conversion kit of claim 1, wherein the wearstrip seat comprises a shallow notch in an upper edge of the base separated from an elongated opening by a lateral beam.

6. The conversion kit of claim 5, wherein the nonlinear channel on the wearstrip comprises a first vertical portion in communication with and extending up from the bottom surface of the wearstrip, a transverse portion extending downward at an angle from the top of the first vertical portion and a second vertical portion extends up from the bottom of the transverse portion, which is above the bottom surface of the wearstrip.

7. The conversion kit of claim 6, wherein the lateral beam is inserted through the nonlinear channel and sits at the bottom of the second vertical portion.

8. A bracket for connecting a wearstrip and containment block to a longitudinally extending spine of a conveyor frame, comprising:
   a base extending laterally from a first side to a second side,
   a wearstrip seat formed in an upper edge of the base for receiving a wearstrip;
   an opening in a bottom edge of the base for mounting the base on a shaft; and
   a containment block receptacle formed in the first side of the base for interlocking with a containment block, the containment block receptacle comprises a planar sheet extending perpendicular to the base, a first elongated opening in the planar sheet below a top edge of the planar sheet and a second elongated opening aligned with the first elongated opening formed in the base near the first side.

9. The conversion kit of claim 8, wherein the base is curved.

10. A conversion kit for converting a conveyor frame to accommodate wearstrips forming a carryway for a conveyor belt, comprising:
    a plurality of straight brackets, each straight bracket extending from a first side to a second side and having a plurality of first open slots in an upper edge, a first flange extending up from the first side and having a second open slot extending perpendicular to the first open slots and a second flange extending up from the second side and having a third open slot extending parallel to the second open slot; and
    a plurality of curved brackets, each curved bracket having a curved base extending from a first side to a second side, a plurality of fourth open slots in an upper edge of the curved base, a third flange extending perpendicular to the upper edge at the first side and having a fifth open slot facing inwards and extending perpendicular to the third flange and a fourth flange extending perpendicular to the upper edge at the second edge and having a sixth open slot facing inwards extending perpendicular to the fourth flange, wherein the straight brackets are mounted at first and second ends of a spine and the curved brackets are mounted at intermediate points on the spine.

11. The conversion kit of claim 10, further comprising a plurality of wearstrips configured to be inserted in the first, second, third, fourth, fifth and sixth open slots to form a carryway extending from the first end of the spine to the second end of the spine and side guards for the carryway.

12. The conversion kit of claim 10, wherein the third and fourth flanges include recesses on an outer surface for seating a reinforcing bar.

13. The conversion kit of claim 12, further comprising reinforcing bars seated in the recesses and extending between consecutive curved brackets.

14. A conversion kit for converting a conveyor frame comprising a plurality of shaft to accommodate wearstrips forming a carryway for a conveyor belt, comprising:
    a first bracket comprising a base, a wearstrip seat formed in the base for receiving a wearstrip, the wearstrip comprising a notch in an upper edge of the base separated from an elongated opening by a lateral beam, and a shaft holder comprising a protrusion extending from the base and a shaft seat at the end of the protrusion for seating a shaft of the conveyor frame;
    a wearstrip having a nonlinear channel for interlocking with the wearstrip seat.

15. The conversion kit of claim 14, wherein the nonlinear channel on the wearstrip comprises a first vertical portion in communication with and extending up from the bottom surface of the wearstrip, a transverse portion extending downward at an angle from the top of the first vertical portion and a second vertical portion extends up from the bottom of the transverse portion, which is above the bottom surface of the wearstrip.

16. The conversion kit of claim 15, wherein the lateral beam is inserted through the nonlinear channel and sits at the bottom of the second vertical portion.

* * * * *